US009295000B2

(12) United States Patent
Chang et al.

(10) Patent No.: US 9,295,000 B2
(45) Date of Patent: Mar. 22, 2016

(54) POWER MANAGEMENT IN A PORTABLE COMMUNICATION DEVICE CONFIGURATION VERSION

(75) Inventors: Henry Chang, San Diego, CA (US); Doug Dunn, Chula Vista, CA (US)

(73) Assignee: KYOCERA Corporation, Kyoto (JP)

( * ) Notice: Subject to any disclaimer, the term of this patent is extended or adjusted under 35 U.S.C. 154(b) by 1838 days.

(21) Appl. No.: 11/740,231

(22) Filed: Apr. 25, 2007

(65) Prior Publication Data

US 2008/0268917 A1 Oct. 30, 2008

(51) Int. Cl.
*H04W 52/02* (2009.01)
*H04W 76/00* (2009.01)

(52) U.S. Cl.
CPC ........ *H04W 52/0261* (2013.01); *H04W 76/007* (2013.01); *Y02B 60/50* (2013.01)

(58) Field of Classification Search
CPC .......... H04W 52/0261; H04W 76/007; H04W 16/32; H04W 52/04; Y02B 60/50
USPC ................ 455/574, 522, 343.1, 343.2, 343.5; 370/311, 318
See application file for complete search history.

(56) References Cited

U.S. PATENT DOCUMENTS

| 6,826,394 | B1* | 11/2004 | Raith et al. ................. 455/404.2 |
| 2003/0193911 | A1* | 10/2003 | Zhao et al. .................... 370/331 |
| 2003/0231586 | A1* | 12/2003 | Chheda ......................... 370/230 |
| 2004/0180701 | A1* | 9/2004 | Livet et al. .................... 455/574 |
| 2004/0204181 | A1 | 10/2004 | Cromer et al. |
| 2005/0047382 | A1* | 3/2005 | Park et al. ...................... 370/338 |
| 2005/0058078 | A1* | 3/2005 | Jung et al. ..................... 370/241 |
| 2007/0004376 | A1 | 1/2007 | Kogure |
| 2007/0270145 | A1* | 11/2007 | Feng et al. .................... 455/436 |

FOREIGN PATENT DOCUMENTS

| EP | 1 513 293 | 3/2005 |
| WO | WO 2007/050687 | 5/2007 |

* cited by examiner

*Primary Examiner* — George Eng
*Assistant Examiner* — Jing Gao (57) ABSTRACT

A portable communication device transmits, to a communication network, a radio configuration (RC) request indicator requesting assignment of a power saving radio configuration for reverse link transmissions. The power saving radio configuration is one a plurality of radio configurations including the power saving radio configuration and at least one other radio configuration defined by a communication standard different than the communication standard defining the power saving radio configuration. Average power consumption at the portable device when the portable communication device participates in the call using the power saving radio configuration is less than if the other radio configuration is used for the call.

1 Claim, 4 Drawing Sheets

POWER MANAGEMENT IN A PORTABLE COMMUNICATION DEVICE CONFIGURATION VERSION

FIELD OF THE INVENTION

This invention generally relates to wireless communications and more particularly to power management in a portable communication device based on Radio Configuration version.

BACKGROUND

Portable communication devices such as cellular telephones, personal computer (PC) cards, and wireless personal digital assistants (PDAs), typically include batteries for providing power to the circuitry of the device. The time that a device can operate before the charge of a battery is depleted depends on several factors including the power level and durations of wireless transmissions. The wireless transmitter and other circuitry used for the transmission of wireless signals consume relatively large amounts of energy compared to other circuits. Portable communication devices are required to operate in accordance with a radio configuration in order to communicate within a wireless communication network. For example, portable communication devices that operate in accordance with Code Division Multiple Access (CDMA) standards such as the IS-95 and IS-2000 CDMA standards must transmit signals in accordance with a Radio Configuration utilized by the particular communication network and base station. The term Radio Configuration is introduced in the IS-2000 standard which is revision of the earlier IS-95 standard. In the legacy IS-95 networks, radio configurations RC1 and RC2 may be used for both the forward link and the reverse link. For IS-2000 CDMA standards, new radio configurations including RC3, RC4, and RC5 were added to RC1 and RC2. In addition to the RC1 and RC2 radio configurations, IS-2000 compliant devices may use radio configurations RC3, RC4 or RC5 for the forward link and RC3 and RC4 for the reverse link. Accordingly, the IS-2000 CDMA standards must also support the legacy radio configurations RC1 and RC2 for backwards compatibility. Typically, the network uses the same radio configurations for forward link and reverse link with the exception that RC5 in the forward link usually maps to RC4 in the reverse link. Since the power consumption of the portable communication device is most affected during the transmission of wireless signals, the radio configurations of interest are the reverse-link radio configurations RC1, RC2, RC3 and RC4. A radio configuration is a set of forward traffic channel and reverse traffic channel transmission formats that are characterized by physical layer parameters such as data rates, modulation characteristics, and spreading rates. The different radio configurations impact power consumption and network capacity differently. For example, RC1 and RC2 use more network resources than RC3 and RC4. Power consumption by a portable communication device using RC1 or RC2 is less than power consumption by the same device using RC3 or RC4. RC3 and RC4 provide for more efficient forward power control than RC1 and RC2 resulting in an increased network capacity as compared to networks using RC1 and RC2. RC3 and RC4, however, typically require the transmitter to be active continuously whenever a call is active regardless of whether any voice or data packets are required to be sent on the reverse link while a device transmitter operating in accordance with RC1 and RC2 is turned on and off depending on whether voice or data packets are sent over the reverse link. The average transmission power for a device transmitting using RC1 or RC2 may be the same for a similar transmission using the corresponding SO using RC3 or RC4. The power consumption of the device, however, is significantly less for RC1 and RC2 than for RC3 and RC4 for similar data rates. Talk times for devices operating with RC3 and RC4 are typically 15% to 30% less than devices operating with RC1 and RC2.

Therefore, there is a need for power management of a portable communication device based on radio configuration.

SUMMARY

A portable communication device transmits, to a communication network, a radio configuration (RC) request indicator requesting assignment of a power saving radio configuration for reverse link transmissions. The portable communication device is capable of operating in accordance with a plurality of radio configurations that includes the power saving radio configuration and at least one other radio configuration. Average power consumption at the portable device when the portable communication device participates in the call using the power saving radio configuration is less than if the other radio configuration is used for the call.

DETAILED DESCRIPTION

In accordance with an exemplary embodiment, when a portable communication device determines that the remaining battery charge is below a threshold, the portable communication device sends a radio configuration (RC) request indicator requesting assignment of a power saving radio configuration that results in less power consumption at the portable communication device than if another radio configuration is used. Although the RC request indicator may be transmitted using any of numerous messages and formats, the RC request indicator is transmitted within a Service Request Message in the exemplary embodiment. The RC request indicator may be transmitted during a service negotiation procedure or during an active call. In the exemplary embodiment, the RC request indicator indicates that remaining battery charge at the portable communication device is sufficiently low to warrant assignment of a radio configuration that minimized power consumption at the portable communication device. Since the power saving radio configuration may result in the use of additional network resources as compared to other radio configurations, the base station assigns the power saving radio configuration for the reverse link transmissions if it is determined that the base station has sufficient capacity to support the additional resource load due to the use of the power saving radio configuration by the portable communication device. Otherwise, the base station assigns another radio configuration supported by the communication standard that results in more efficient use of communication resources. If the request is made during an active call and the base station determines that the power saving radio configuration should not be assigned, the base station continues to use the same radio configuration that was assigned without assigning a new RC.

Figure 1:
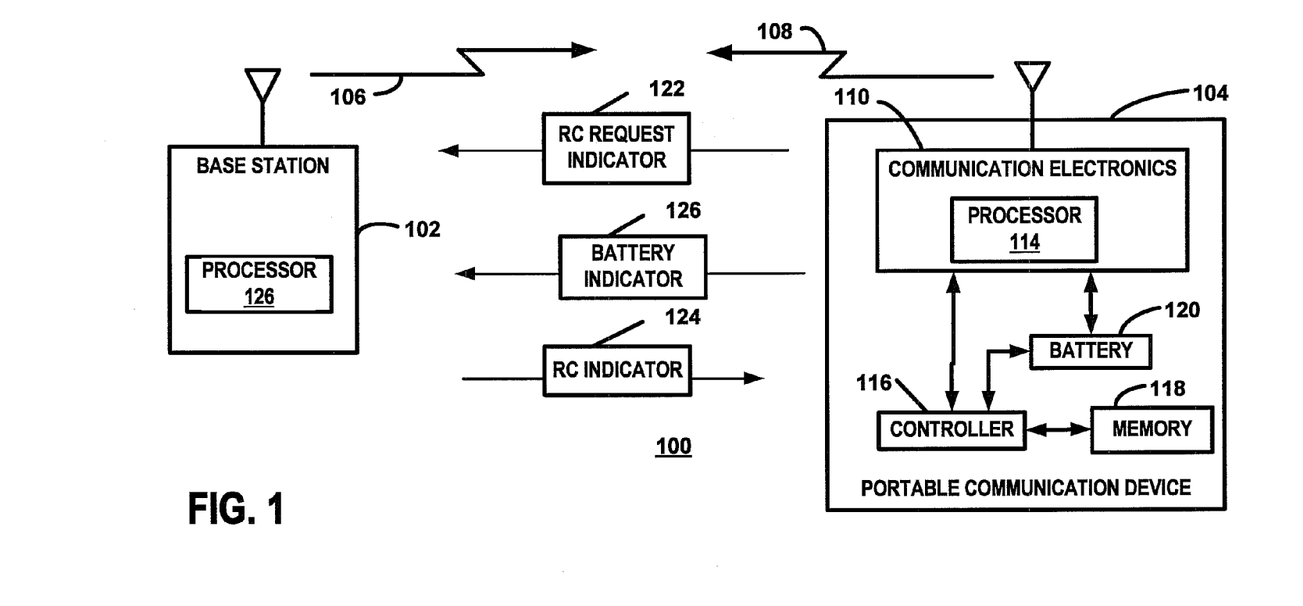
FIG. 1 is a block diagram of a wireless communication system.

FIG. 1 is block diagram of a communication system 100 including at least one base station 102 and one portable communication device 104. In a typical implementation, several base stations 102 provide wireless service to numerous portable communication devices 104. Communication resources, such as bandwidth, are efficiently allocated between the portable communication devices 104 to maximize the number of users on the system 100. Each base station 102, therefore, has a user capacity that depends on the total resource requirements of the portable communication devices 104. As mentioned above, the base stations 102 and portable communication devices 104 transmit signals in accordance with radio configurations. Forward link traffic signals 106 are transmitted from the base station 102 to the portable communication device 104 reverse link traffic signals 108 are transmitted from the portable communication device 104 to the base station 102 in accordance with a radio configuration. Each radio configuration defines a set of forward traffic channel transmission formats and reverse traffic channel transmission formats that are characterized by physical layer parameters such as data rates, modulation characteristics, and spreading rates. The different radio configurations impact power consumption and base station capacity differently. The portable communication device 104 is capable of transmitting reverse link signals in accordance with at least two radio configurations where one of the radio configurations is power radio configuration which results in less power consumption at the portable communication device than at least one other radio configuration supported by the portable communication device. One of the at least two radio configurations may not be defined for some communication standard revisions. For example, a portable communication device capable of operating in accordance with the IS-2000 standard can use radio configurations RC1, RC2, RC3 and RC4. Radio configurations RC3 and RC4 are not defined by the earlier revision of the IS-2000 standard, i.e. the IS-95 standard. In some circumstances, the power saving radio configuration is defined by multiple standard revisions and results in less power consumption at the portable communication device than if another radio configuration is used where the other radio configuration may only be defined in some communication standard revisions. For example, the power saving radio configuration may be either RC1 or RC2 and the other radio configuration may be RC3 or RC4 in systems 100 operating in accordance with CDMA standards.

Communication electronics 110 within the portable communication device 104 perform modulation and spreading as well as other communication functions. The communication electronics 110 can be configured to provide different data rates, modulation characteristics, and spreading rates. In the exemplary embodiment, parameters of software and/or firmware running on a processor 114 are modified to change the functions of the communication electronics 110 such that the communication electronics 110 are configured to transmit and receive signals in accordance with radio configurations. A controller 116 within the portable communication device 104 configures communication electronics 110 to operate in accordance with the assigned radio configurations by modifying, replacing, or otherwise manipulating the software running on the processor 114 that determines the radio configuration parameters. The controller 116 may be implemented on the processor 114, on a separate processor, or distributed over multiple processors. Accordingly, the controller 116 is shown as a separate block to illustrate that the functions of manipulating and setting the communication electronics 110 are separate from the functions of the processor 114 related to communications such as modulation, coding, and spreading, for example. Software and/or firmware code running on the controller 116 retrieves the appropriate values from memory 118 to configure the communication electronics 110 in accordance with a specified radio configuration. In the exemplary embodiment, the communication electronics 110 are configured by loading the appropriate values in software and/or firmware running on the processor 114. In some circumstances, other techniques may be used to configure the communication electronics 110. For example, software and/or firmware code corresponding to the desired radio configuration may be loaded or exchanged for code corresponding to other radio configurations. The controller 116, therefore, may configure the processor 114 to use the appropriate modulation scheme using code stored in the memory 118.

Although the exemplary communication system 100 operates in accordance with Code Division Multiple Access (CDMA) standards such as the IS-95 and IS-2000 CDMA standard revisions, the teachings discussed herein may be applied to other systems and standards. IS-95 networks utilize radio configurations RC1 and RC2 while IS-2000 networks support radio configurations RC1 and RC2 but also support more advanced radio configurations RC3 and RC4. RC1 and RC2 generally use more communication resources than RC3 and RC4. Average power consumption by a portable communication device using RC1 or RC2, however, is less than power consumption by the same device using RC3 or RC4. RC3 and RC4 provide for more efficient forward power control than RC1 and RC2 resulting in an increased network capacity as compared to networks using RC1 and RC2. RC3 and RC4, however, require the transmitter to be active continuously whenever a call is active regardless of whether any voice or data packets are required to be sent on the reverse link while a device operating in accordance with RC1 and RC2 gates the transmitter in the device on and off depending on whether voice or data packets are sent over the reverse link. The average radio frequency (RF) transmission power for a portable communication device 104 using RC1 or RC2 for transmission may be the same for a similar transmission using RC3 or RC4. The average power consumption of the device, however, is significantly less for RC1 and RC2 than for RC3 and RC4 for similar data rates. Talk times for devices operating with RC3 and RC4 are typically 15% to 30% less than devices operating with RC1 and RC2. Therefore, as discussed with reference to the exemplary embodiment, the power saving radio configuration is RC1 or RC2 when the portable communication device 104 is capable of operating in accordance with an IS-2000 CDMA standard. After receiving a request for a power saving radio configuration, a base station 102 may assign RC1 or RC2 to the portable communication device 104 instead of RC3 or RC4.

The portable communication device 104 at least periodically monitors the remaining battery charge by measuring battery parameters of a battery 120. The battery 120 provides power to the communications electronics 110 as well as other circuits, devices, and components within the portable communication device 104. The controller 116 monitors the battery charge to determine when the remaining power is below a threshold. Any of numerous known techniques may be used to determine the remaining battery charge. In some circumstances, for example, sensing circuitry (not shown) provides information related to the remaining battery charge to the controller 116. The sensing circuit generates one or more signals representing battery characteristics such as voltage and/or current to the controller 116. The controller 116 determines the remaining battery charge based on the type of battery and the signals provided by the sensing circuit. The controller 116 sends a power saving radio configuration (RC) request indicator 122 to the base station 102 when the controller 116 determines that the remaining battery charge is below the threshold. The power saving RC indicator 122 is sent in a request message to the base station 102 where the message may be sent during a service negotiation process or during an active call. In the exemplary embodiment, a battery indicator 126 is sent prior to the request indicator 122 to provide the base station with information regarding the remaining charge of the battery 120. Any of numerous parameters related to charge may be monitored or evaluated. For example, parameters related to power or energy may measured and/or evaluated.

During a service negotiation process between the portable communication device 104 and the base station 102, the base station 102 receives information from the portable communication device 104 indicating the capabilities of the portable communication device 104. In accordance with CDMA standards, for example, the portable communication device 104 indicates a mobile protocol revision (MOB_P_REV). In conventional systems 100, the base station 102 assigns the latest revision radio configuration supported by the MOB_P_REV of the portable communication device 104 and supported by the base station 102 as required for the service option (SO) of the particular call. In the exemplary embodiment, however, the base station 102 determines the appropriate radio configuration also based on the RC request indicator 122 and battery indicator 126 received from the portable communication device 104. If no RC request indicator 122 is received, the base station 102 assigns a radio configuration in accordance with known techniques. If a RC request indicator 122 had been received, the base station 102 evaluates the current capacity of the base station 102 and remaining power level of at least the portable communication device 104 making the request and determines whether the amount of additional communication resources needed for the portable communication device 104 to transmit reverse link signals using the power saving radio configuration is acceptable. In some circumstances, transmission of the battery indicator 126 may be omitted.

In accordance with CDMA techniques, the base station 102, transmits a service connect message including the appropriate information for assigning the radio configuration to the portable communication device 104. Accordingly, a radio configuration indicator 124 is transmitted in a message to indicate the radio configuration that should be used by the portable communication device 104. The radio configuration indicator 124 takes the form of a Service Connect Message during call set up and takes the form of a Service Response Message if after dedicated channels are assigned, and the form of a Universal Handoff Direction Message, Service Response Message, or General Handoff Direction Message, if the assignment is a re-assignment of the radio configuration during a call after a Service Connect Completion Message is received from the portable communication device 104. If a RC request indicator 122 was received from the portable communication device 104 and the burden on the communication resources is acceptable, the base station 102 assigns the power saving radio configuration. Otherwise, the base station 102 assigns another radio configuration providing more efficient use of communication resources. For example, if a CDMA IS-2000 compliant portable communication device 104 sends a RC request indicator 122 and the base station 102 determines that assigning RC1 instead of RC3 for a call would not significantly affect the capacity of the base station 102, the base station 102 assigns RC1 for reverse link transmissions. Otherwise, RC3 is assigned. A processor 126 in the base station 102 performs the evaluations and determines the radio configuration that should be assigned to each portable communication device 104 for each call. If the request for a power saving RC is received during a call, the base station determines whether the power saving RC should be used and initiates a Universal Handoff Direction Message assigning the power saving RC only if the base station determines that the change in radio configuration is appropriate.

The portable communication device sends a RC request indicator 122 during a call if the call has been established using a radio configuration that is not a power saving radio configuration and the remaining battery charge falls below the threshold. If adequate resources are available and the base station 102 determines a radio configuration change is appropriate, the base station 102 sends a Universal Handoff Direction Message, a General Handoff Direction Message or a Service Response Message to the portable communication device with the Service Configuration Record field (SCR_INCLUDED) set to '1' along with the specified reverse radio configuration (REV_FCH_RC) to be used.

Figure 2A:
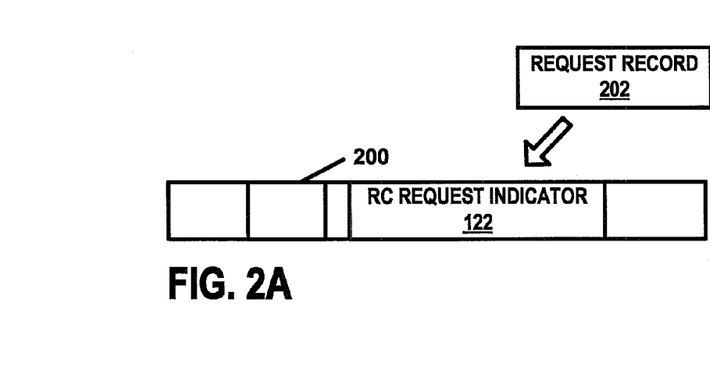
FIGS. 2A and 2B are block diagrams depicting exemplary power saving radio configuration request messages.

FIG. 2A is a block diagram of an exemplary radio configuration (RC) request message 200. Depending on the particular implementation of the system 100, the RC request message 200 may be have any one of several formats and may be implemented as part of other messages or a separate message. In some circumstances, the RC request message 200 is transmitted as part of a standardized protocol as specified by a communication standard whereby modification to the communication standard is required. In other circumstances, the message 200 may be sent using a message that does not require modification of the current standards. For example, the message 200 may be sent using messages currently defined by the standards as described below with reference to the exemplary embodiment or may be sent using a data messaging technique.

An example of a suitable data messaging technique includes sending a the message 200 as a short message service (SMS) message transmitted to an SMSC (Short Message Service Center) that is usually separate from the base station 102. The SMS message includes text that represents the power saving RC indicator 122. The SMSC may in turn notify the base station 102 of the request for change to the power saving RC.

In the exemplary embodiment, the message 200 is a Service Request Message transmitted in accordance with CDMA standards where a request record Service Configuration Record 202 is used to form the message 200. A service configuration information record includes a RC field that includes a requested radio configuration. Therefore, the RC power saving request indicator 122 is an identification of the power saving RC that is transmitted in a Service Request Message and included in the RC field of the Service Configuration Information Record used to form the Service Request Message. The Service Request Message is sent using a traffic channel and not a common channel. During service negotiation, after the portable communication device receives the Service Connect Message, the device 104 has the option to request a different REV_FCH_RC using the Service Request Message.

Another example of a suitable RC request message 200 that does not require modification of the existing standard is a call establishment message such as an Origination Message or a Page Response Message. These messages include a field named REV_RC_PREF which allows a portable communication device to request a preferred radio configuration.

In the exemplary embodiment, a battery indicator is sent from the portable communication device 104 to the base station 102 that provides information regarding the remaining charge of the battery. As discussed below, the battery indicator may be sent using techniques that may or may not require modification to existing standards. In some circumstances, the power saving RC request indicator 122 may be a battery indicator. In such implementations, the base station evaluates the battery indicator and interprets the battery indicator as a request for a power saving radio configuration if the remaining battery charge of portable communication device is below a threshold.

Figure 2B:
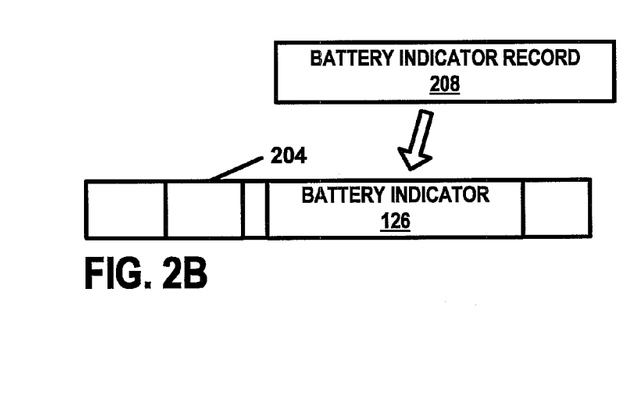

FIG. 2B is a block diagram of a battery indicator message 204. In the exemplary embodiment, the battery indicator message 204 is a Status Message transmitted using a traffic channel. A battery indicator record 208 is used to form the battery indicator message 204 with a battery indicator 126 that provides information regarding the remaining battery charge of the portable communication device 104 that is transmitting the message 206. The battery indicator may be any measured or calculated parameter that allows the base station to determine the charge remaining in the battery 120. In some circumstances, the battery indicator message 204 may be an SMS message.

Figure 3:
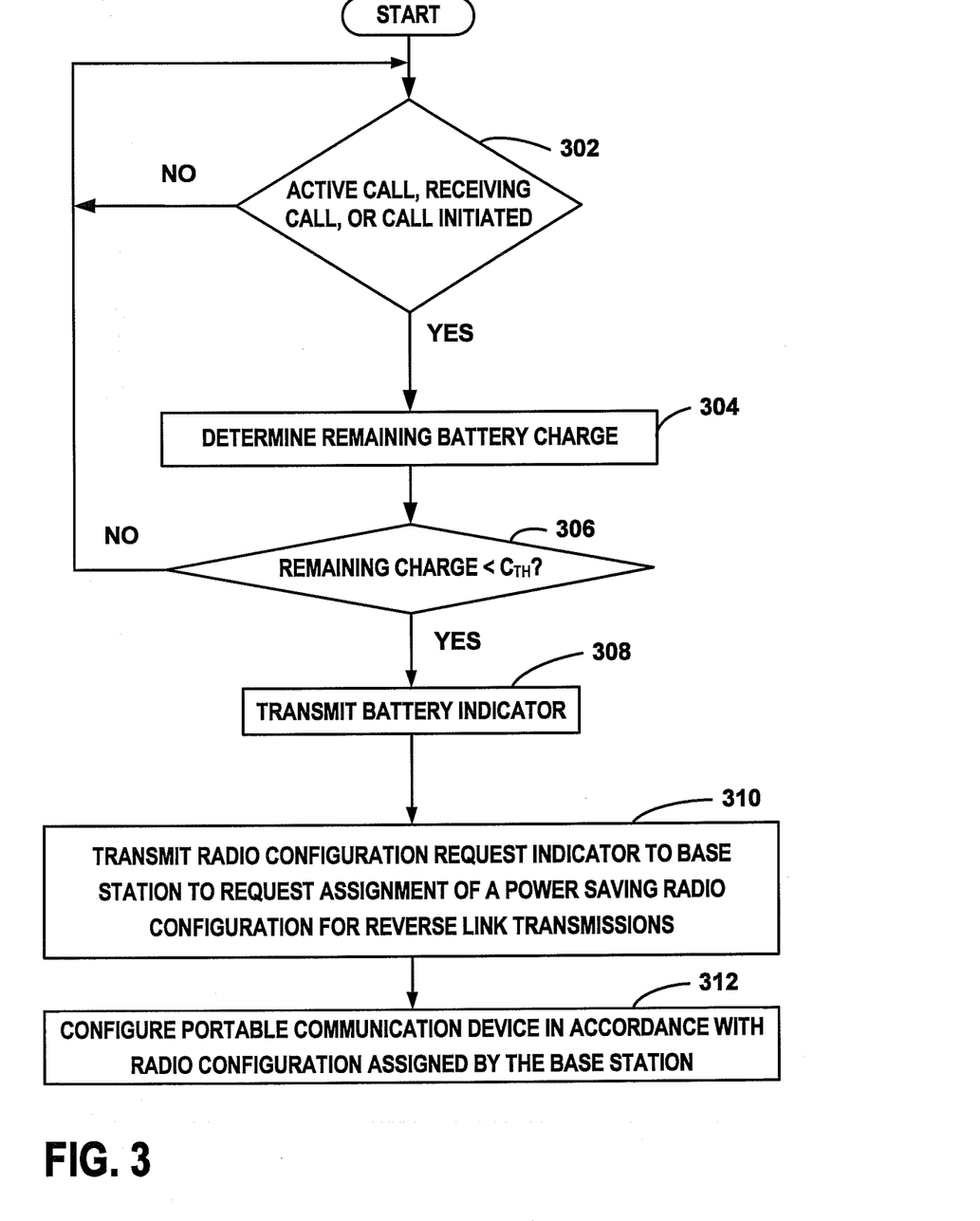
FIG. 3 is a flow chart of a method of power management performed at a portable communication device in accordance with the exemplary embodiment.

FIG. 3 is a flow chart of a method of power management performed in a portable communication device in accordance with the exemplary embodiment. The method may be performed using any combination of hardware, software, and/or firmware using any of numerous types of devices. In the exemplary embodiment, the method is executed by software running on the processor 122 in a portable communication device 104.

At step 302, it is determined whether the portable communication device 104 is engaged in an active call or if a call will be established. The controller 116 determines if a call is being initiated at the portable communication device 104, if a call is being received, or if call has been established. If a call has been established or will be established, the method continues at step 304. Otherwise the method returns to step 302 to continue monitoring the call status.

At step 304, a remaining battery charge within the portable communication device is measured. A sensing circuit generates one or more signals representing battery characteristics such as voltage and/or current to the controller 116. The controller 116 determines the remaining battery charge based on the type of battery and the signals provided by the sensing circuit. Any of numerous known techniques may be used to determine the remaining batter charge.

At step 306, it is determined whether the remaining battery charge is below a threshold ($C_{TH}$). If the remaining battery charge is below the threshold, the method proceeds to step 308, otherwise the method returns to step 302 to continue monitoring call status and battery charge at step 304. An example of a suitable value for the threshold is a value near 30% of total battery charge.

At step 308, a battery indicator 126 is transmitted to the base station 102. In the exemplary embodiment, the battery indicator 126 is transmitted in a Status Message formed with a battery indicator record 208 that corresponds to the remaining battery charge. The battery indicator may be transmitted using other techniques and, in some circumstances, may be omitted.

At step 310, a RC request indicator 122 is transmitted to the base station 102 in the communication network. As discussed above, the RC request indicator 122 indicates that the portable communication device 104 is requesting that a power saving radio configuration be assigned for reverse link transmissions. The power saving radio configuration is one of plurality of radio configurations that results in less power consumption at the portable communication device than at least one other radio configuration of the plurality. One of the plurality of radio configurations may not be defined for some communication standard revisions. As discussed above, for example, RC3 and RC4 are defined for the newer IS-2000 revisions but not for IS-95 revisions. In the exemplary embodiment, the plurality of radio configurations for the reverse link includes at least RC1, RC2, RC3 and RC4. Accordingly IS-2000 compliant networks and portable communication devices are capable of using RC1, RC2, RC3 and RC4 while IS-95 compliant networks and portable communication devices are capable of using RC1 and RC2.

At step 312, the portable communication device 104 configures the communication electronics 110 in accordance with the radio configuration indicated by the base station 102. During the call negotiation procedure, the base station 102 indicates the radio configuration to the portable communication device 104 by transmitting a RC indicator 124 in accordance with known techniques. The controller 116 loads the appropriate values or otherwise configures the communication electronics 110 such that reverse link data transmissions are transmitted using the modulation, data rate and spreading rate required by the radio configuration indicated by the base station 102. Accordingly, if the base station 102 determines that the power saving radio configuration can be used, the portable communication device 104 loads the RC1 or RC2 configuration which results in less average power consumption than if a RC3 or RC4 radio configuration were used for reverse link transmissions. If the radio configuration is changed during an active call, the power saving radio configuration is assigned using a Universal Handoff Direction Message if the assignment of the radio configuration is during a call.

Therefore, in the exemplary embodiment, if a call is initiated at the portable communication device and battery charge is low, the portable communication device 104 transmits a RC request indicator 122 to the base station 102 where the RC request indicator 122 indicates that the portable communication device 122 is requesting assignment of a power saving radio configuration that results in less power consumption at the portable communication device 104 than if another radio configuration is assigned. If a call is being received at the portable communication device 104 and the battery charge is low, the portable communication device 104 transmits the RC request indicator 122 requesting the base station to assign the power saving radio configuration for the call. When the portable communication device detects that call is being initiated when the remaining battery charge level is below the power level threshold, the portable communication device sends the RC request indicator 122. If the portable communication device 104 detects that the remaining power level has fallen below the threshold while engaged in a call, the RC request indictor 122 is sent. As discussed below with reference to FIG. 4, the base station 102 assigns the power saving radio configuration if the base station 102 determines that adequate communication resources are available. As a result, the portable communication device 104 utilizes the power saving radio configuration for reverse link transmissions although the call may result in consuming more communication resources than other radio configurations.

Figure 4:
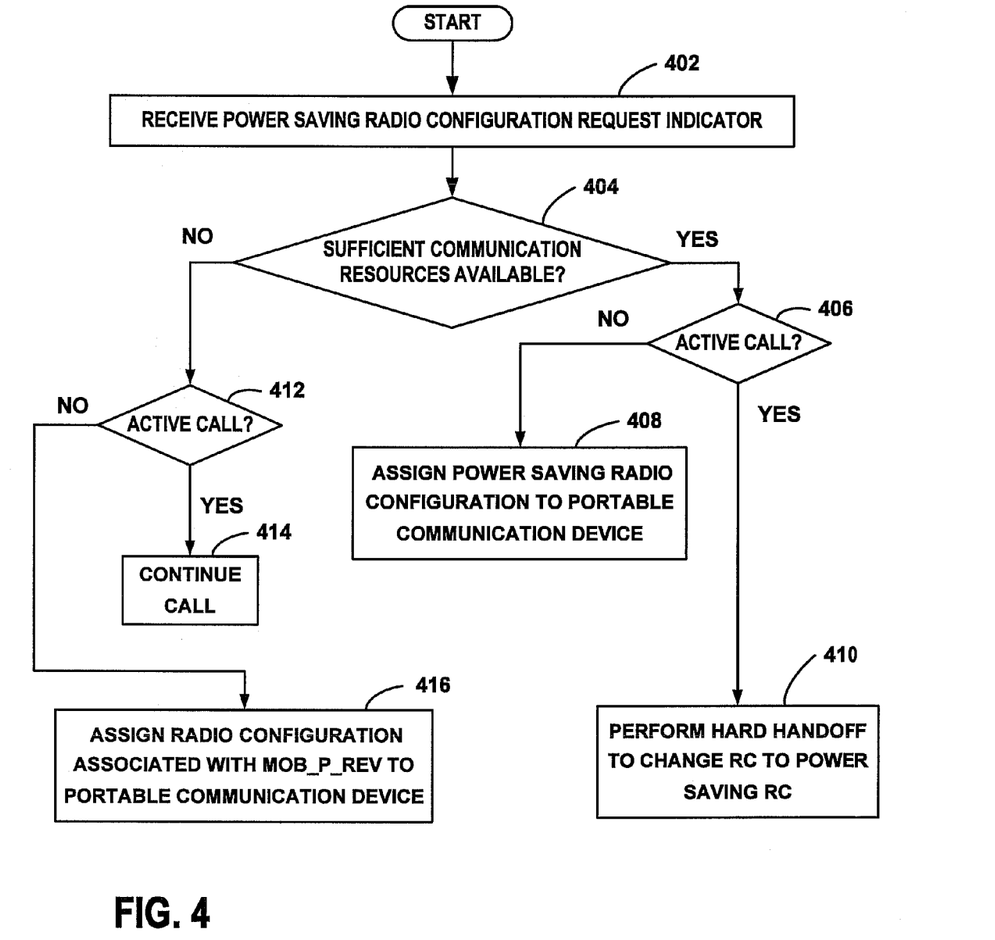
FIG. 4 is a flow chart of a method of portable device power management performed at a base station in accordance with the exemplary embodiment.

FIG. 4 is a flow chart of a method of portable device power management performed at a base station 102 in accordance with the exemplary embodiment. The method may be performed by any combination of hardware, software and/or firmware. In the exemplary embodiment, the method is performed by executing code on processor 126 in the base station 102. The method is invoked either during an active call or when a call is being established with a portable communication device.

At step 402, a RC request indicator 122 is received from the portable communication device 104. A request message including the indicator 122 is received and decoded. In the exemplary embodiment, the request message is a Service Request Message based on a Service Configuration Record. As explained above, the RC request indicator 122 may be sent using any of several techniques and messages such as SMS messages and signaling messages. The RC request indicator 122 is interpreted as a request by the portable communication device 104 to be assigned a power saving radio configuration. In some situations the Battery Indicator 126 may be sent to the base station indicating the remaining battery charge. In these situations, the base station 102 also determines if the remaining charge is low enough to warrant a power saving radio configuration.

At step 404, it is determined whether sufficient communication resources are available to assign the power saving radio configuration. The base station 102 evaluates parameters related to the available capacity at the base station 102. For example, parameters related to the number of active calls and data rates as well at the total capacity of the base station 102 are examined in some cases. Other parameters, such as time of day, day of the week, and communication traffic patterns, may also be evaluated to as well as trends in communication traffic. In the exemplary embodiment, the processor 126 evaluates the remaining battery charge levels of requesting portable communication devices, and prioritizes portable communication devices 104 based on the associated remaining battery charges and available capacity in determining whether adequate resources are available for assigning a power saving radio configuration to a particular portable communication device 104. If adequate remaining capacity is available, the method continues at step 406. Otherwise, the method continues at step 408.

At step 406, it is determined whether the portable communication device 104 is engaged in an active call. If the portable communication device 104 is engaged in an active call, the method proceeds to step 410. Otherwise, the method continues at step 408.

At step 408, the base station 102 assigns a power saving radio configuration to the portable communication device 104. The base station 102 transmits a radio configuration indicator 122 in a service connect message in accordance with known techniques.

At step 410, the base station 102 performs a hard handoff procedure to change the radio configuration at the portable communication device 104 to the power saving radio configuration. The base station 102 transmits a Universal Handoff Direction Message, a General Handoff Direction Message or a Service Response Message to change the radio configuration. Accordingly, the base station 102 may be communicating with portable communication device 104 that is transmitting reverse link signals in accordance with RC3 or RC4 during a call when a RC request indicator 122 received. If communication resources are available, the base station 102 instructs the portable communication device 102 to change radio configuration to RC1 or RC2 and perform a hard handoff.

At step 412, it is determined whether the portable communication device 104 is engaged in an active call. If the portable communication device 104 is engaged in an active call, the method continues at step 414. Otherwise, the method proceeds to step 416.

At step 414, the base station 102 continues with the active call. No radio configuration changes are made based on the received RC request indicator 122.

At step 416, the base station 102 assigns a radio configuration corresponding to the mobile protocol revision (MOB_P_REV) of the portable communication device 104. Therefore, for the example, if the base station 102 determines that adequate resources are not available to assign RC1 or RC2 and the portable communication device 104 supports IS-2000, the base station 102 assigns a radio configuration such as RC3 or RC4.

Figure 5:
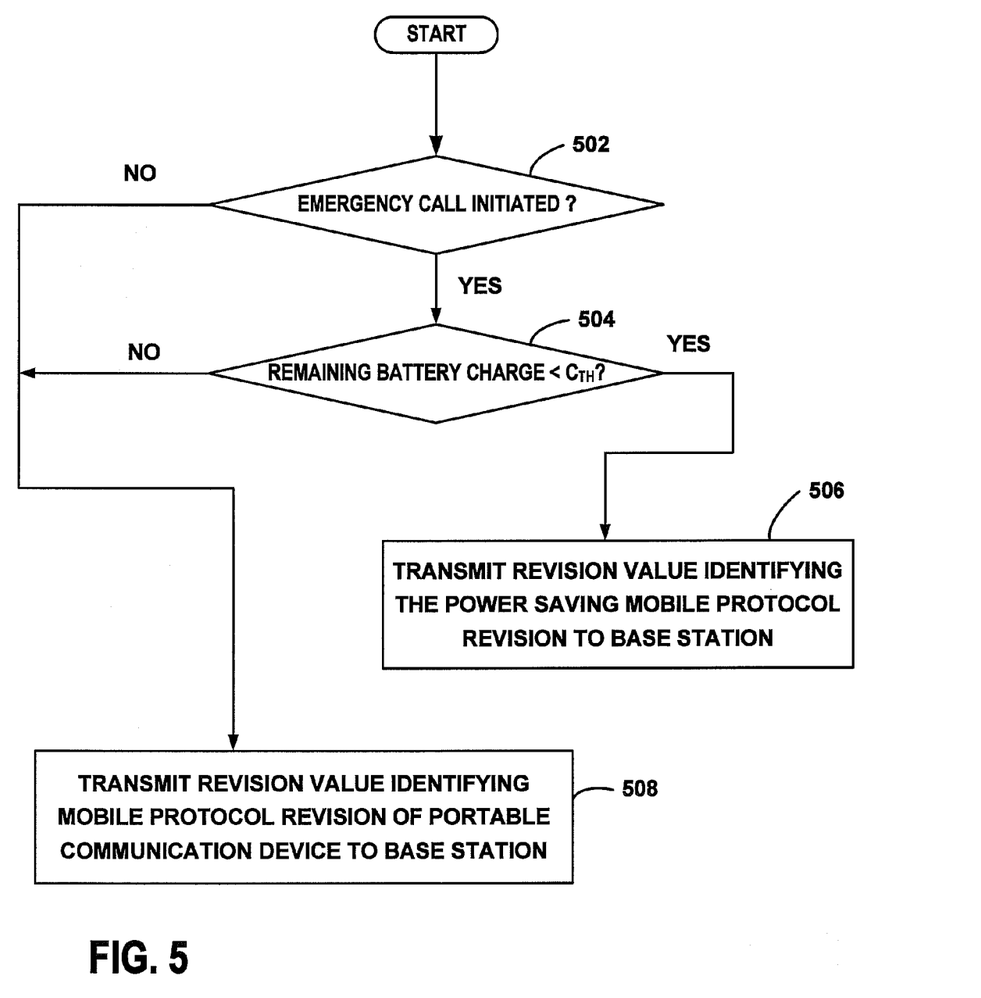
FIG. 5 is a flow chart of a method of emergency power management performed in a portable communication device.

FIG. 5 is a flow chart of a method of emergency power management performed in a portable communication device 104. The method may be performed using any combination of hardware, software, and/or firmware using any of numerous types of devices. In the exemplary embodiment, the method is executed by software running on the processor 114 in a portable communication device. The method is invoked when a call is initiated at the portable communication device 104.

At step 502, it is determined whether an emergency call has been initiated. The controller 116 monitors the numbers entered by the user and determines if an emergency number, such as "911", has been entered. If an emergency call has been initiated, the method continues at step 504. Otherwise, the method proceeds to step 508.

At step 504, it is determined whether the remaining battery charge is less than a threshold. The threshold may be the same at the threshold discussed above with reference to FIG. 3. If the remaining battery charge is less than the threshold, the method continues at step 506. Otherwise the method continues at step 508.

At step 506, the portable communication device 104 transmits a revision value identifying a power saving mobile protocol revision (MOB_P_REV). The power saving MOB_P_REV is a simulated value that indicates to the base station 102 that the portable communication device 104 does not support the more resource efficient radio configurations that are supported by the portable communication device 104. As a result, the base station 102 assigns a radio configuration that corresponds to the simulated power saving MOB_P_REV, where the assigned radio configuration is a power saving radio configuration. The simulated MOB_P_REV is transmitted in an Call Origination Message in accordance with known techniques for transmitting the MOB_P_REV. Accordingly, the portable communication device 104 will use a radio configuration for the emergency call that results in lower average power consumption than a radio configuration that would have been assigned for the actual MOB_P_REV of the device 104. For example, if an emergency call is initiated with a portable communication device 104 that has a MOB_P_REV in accordance with IS-2000 and the remaining battery charge level is low, the base station 102 will assign an IS-95 radio configuration based on the simulated power saving MOB_P_REV received from the portable communication device 104. The assigned RC1 or RC2 radio configuration results in less average power consumption than the RC3 or RC4 radio configuration that would have been assigned to the portable communication device 104.

At step 508, a revision value identifying the mobile protocol revision (MOB_P_REV) of the portable communication device 104 is transmitted to the base station 102. Accordingly, if the portable communication device 104 is a capable of supporting of operating in accordance with an IS-2000 communication standard, the transmitted MOB_P_REV will reflect those capabilities.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A process for power management performed in a portable communication device capable of operating in accordance with any one of a plurality of radio configurations, each radio configuration defining a set of traffic channel formats characterized by physical layer parameters including at least data rates and spreading rates, the process comprising:

determining a remaining battery charge is below a threshold;

transmitting, in response to the determining that the remaining battery charge is below the threshold, a radio configuration request indicator to a base station to request assignment of a power saving radio configuration of the plurality of radio configurations, the power saving radio configuration resulting in less power consumption for reverse link transmissions than at least one other radio configuration of the plurality of radio configurations;

forming a request message to include the radio configuration request indicator, wherein forming the request message comprises forming a call establishment message, the call establishment message is selected from group comprising an origination message and a page response message, the radio configuration request indicator comprising a reverse radio configuration preference (REV_RC_PREF) field; and transmitting the request message to the base station.

* * * * *